US009894650B2

United States Patent
Balachandran et al.

(10) Patent No.: US 9,894,650 B2
(45) Date of Patent: *Feb. 13, 2018

(54) SEMI-PERSISTENT RESOURCE ALLOCATION METHOD FOR UPLINK TRANSMISSION IN WIRELESS PACKET DATA SYSTEMS

(71) Applicants: Telefonaktiebolaget L M Ericsson (publ), Stockholm (SE); Tripura Ramesh, Santa Clara, CA (US)

(72) Inventors: Kumar Balachandran, Cary, NC (US); Havish Koorapaty, Cary, NC (US); Rajaram Ramesh, Raleigh, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 287 days.

This patent is subject to a terminal disclaimer.

(21) Appl. No.: 14/718,196

(22) Filed: May 21, 2015

(65) Prior Publication Data

US 2015/0257148 A1 Sep. 10, 2015

Related U.S. Application Data

(63) Continuation of application No. 14/174,995, filed on Feb. 7, 2014, now Pat. No. 9,071,419, which is a
(Continued)

(51) Int. Cl.
*H04W 4/00* (2009.01)
*H04W 72/04* (2009.01)
(Continued)

(52) U.S. Cl.
CPC ........... *H04W 72/0446* (2013.01); *H04L 1/08* (2013.01); *H04L 1/1812* (2013.01);
(Continued)

(58) Field of Classification Search
USPC ..... 370/216, 230, 236, 310, 310.2, 328, 333
See application file for complete search history.

(56) References Cited

U.S. PATENT DOCUMENTS 6,233,251 B1 5/2001 Kurobe et al.
8,031,656 B2 * 10/2011 Balachandran ....... H04L 1/1812
370/216

(Continued)

FOREIGN PATENT DOCUMENTS

WO 2007/119148 A2 10/2007
WO 2008/041805 A1 4/2008

OTHER PUBLICATIONS

Office Action issued by the Canadian Intellectual Property Office for Application No. 2689295, dated Oct. 6, 2014.
(Continued)

*Primary Examiner* — Kwang B Yao
*Assistant Examiner* — Nguyen Ngo
(74) *Attorney, Agent, or Firm* — Baker Botts LLP

(57) ABSTRACT

A wireless telecommunications network supplies a semi-persistent resource that a wireless station can use for special purposes (such as a retransmission of packets for ARQ purposes or a control signal. The semi-persistent resource can be allocated by the system to other terminals if, e.g., a retransmission is not required. Since a retransmission is generally performed in response to a NACK received from a base station, the NACK may itself serve as a token that permits the wireless station to use the semi-persistent allocation. Thus, the technology includes, e.g., a method for resource allocation on a semi-persistent basis and efficient signaling for the usage of such allocation.

4 Claims, 5 Drawing Sheets

Related U.S. Application Data continuation of application No. 13/223,599, filed on Sep. 1, 2011, now Pat. No. 8,649,327, which is a continuation of application No. 11/924,258, filed on Oct. 25, 2007, now Pat. No. 8,031,656.

(60) Provisional application No. 60/929,127, filed on Jun. 14, 2007.

(51) Int. Cl.
  *H04L 1/18* (2006.01)
  *H04L 1/08* (2006.01)

(52) U.S. Cl.
  CPC .......... *H04L 1/1825* (2013.01); *H04L 1/1887* (2013.01); *H04W 72/0406* (2013.01)

(56) References Cited

U.S. PATENT DOCUMENTS

| | | | | |
|---|---|---|---|---|
| 8,649,327 B2* | 2/2014 | Balachandran | ....... | H04L 1/1812 370/216 |
| 2007/0189205 A1* | 8/2007 | Terry | ....... | H04L 1/1812 370/328 |
| 2008/0117891 A1 | 5/2008 | Damnjanovic et al. | | |
| 2008/0192674 A1* | 8/2008 | Wang | ....... | H04L 1/1657 370/315 |
| 2008/0232284 A1* | 9/2008 | Dalsgaard | ....... | H04W 72/042 370/310 |
| 2008/0267118 A1* | 10/2008 | Cai | ....... | H04L 1/1671 370/329 |
| 2008/0310356 A1* | 12/2008 | Cai | ....... | H04L 12/5695 370/329 |
| 2009/0003282 A1* | 1/2009 | Meylan | ....... | H04L 12/5693 370/331 |
| 2009/0274107 A1* | 11/2009 | Park | ....... | H04L 12/66 370/329 |
| 2009/0327828 A1* | 12/2009 | Ojala | ....... | H04L 1/1887 714/749 |
| 2010/0208667 A1 | 8/2010 | Chun et al. | | |

OTHER PUBLICATIONS

International Search Report dated Sep. 2, 2008 in corresponding PCT application PCT/SE2007 /050788, dated Sep. 2, 2008.
R2-07046, Uplink Scheduling for VoIP; 3GPP TSG-RAN WG2 Meeting #57; Feb. 12-16, 2007; St, Louis, MO.
R1-062573, Alternative Uplink Synchronous HARQ Schemes, 3GPP TSG RAN WG1 #46-bis; Seoul, Korea; Oct. 9-13, 2006.
Jiang et al, "Principle and Performance of Semi-Persistent Scheduling for VoIP in LTE System", Wireless Communications, Networking and Mobile Computing, 2007, International Conference on WiCom 2007, Sep. 21-25, 2007, DD 2861-2864.
R2-071483, Uplink VoIP Performance; 3GPP TSG RAN WG2 #57bis; St. Julian's, Malta, Mar. 26-30, 2007.

* cited by examiner

SEMI-PERSISTENT RESOURCE ALLOCATION METHOD FOR UPLINK TRANSMISSION IN WIRELESS PACKET DATA SYSTEMS

PRIORITY

This application is a continuation, under 35 U.S.C. § 120, of U.S. application Ser. No. 14/174,995 filed Feb. 7, 2014, which is a continuation, under 35 U.S.C. § 120, of U.S. application Ser. No. 13/223,599 filed Sep. 1, 2011, which is a continuation, under 35 U.S.C. § 120, of U.S. application Ser. No. 11/924,258 filed Oct. 25, 2007, which claims the benefit, under 35 U.S. C. § 119(a), of U.S. Provisional Application Ser. No. 60/929,127, filed Jun. 14, 2007, all of which are incorporated herein by reference.

BACKGROUND

I. Technical Field

This invention is concerned with wireless telecommunications, and is particularly concerned with resource allocation for an uplink transmission in a wireless packet data telecommunications system.

II. Related Art and Other Considerations

In a typical wireless or cellular radio system, wireless user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network. Alternatively, the wireless user equipment units can be fixed wireless devices, e.g., fixed cellular devices/terminals which are part of a wireless local loop or the like.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks. The core network has service domains, with the radio access network having an interface to each of the service domains. For example, the core network typically has a circuit switched domain and a packet switched domain. Accordingly, the radio access network is typically configured to support or accommodate both circuit switched and packet switched connections.

One example of a radio access network is the Universal Mobile Telecommunications (UMTS) Terrestrial Radio Access Network (UTRAN). The UMTS is a third generation system which in some respects builds upon the radio access technology known as Global System for Mobile communications (GSM) developed in Europe. UTRAN is essentially a radio access network providing wideband code division multiple access (WCDMA) to user equipment units (UEs).

The Third Generation Partnership Project (3GPP) has undertaken to evolve further the UTRAN and GSM-based radio access network technologies. Other types of telecommunications systems which encompass radio access networks include the following: Advance Mobile Phone Service (AMPS) system; the Narrowband AMPS system (NAMPS); the Total Access Communications System (TACS); the Personal Digital Cellular (PDS) system; the United States Digital Cellular (USDC) system; and the code division multiple access (CDMA) system described in EIA/TIA IS-95.

There have been many proposals to use wireless packet data systems such as HSPA, CDMA-1x-EV-D0, and WiMAX for voice telephony using Voice over Internet Protocol (VoIP) mechanisms. The voice signal is encoded into packets that are then transmitted over a packet data channel. Similar principles can be applied to the use of the packet data system for other real-time applications such as video telephony etc. For many such real time applications, the encoded packets occur at a regular frequency, and it makes sense to allocate resources for the transmission of such packets on a regular basis.

In general, packet data systems allocate transmission on an as needed basis, e.g., if a wireless station has data to send, it makes a request and is allocated resources. The resource allocation has to be signaled to the wireless station. This signaling uses bandwidth that otherwise could be used to transmit actual user data to other users. For an application that is expected to transmit packets on a regular basis, one method of operating a packet data system involves the use of a persistent resource allocation, e.g., resources are allocated on a regular basis to the wireless station for the transmission of these regular packets. The persistent allocation can be signaled to the wireless station on a long-term basis, rather than signaling an allocation for every packet, thereby saving signaling bandwidth.

Many wireless telecommunications systems employ some type of feedback mechanism to provide a notification whether a transmission was properly received or not. Typically such systems provide a positive acknowledgement of receipt (ACK) or a negative notification (NACK) in the event of non-receipt or suspected faulty receipt of transmission contents. To assess transmission contents, many receivers have content checkers which can operate upon features of the transmission contents, such features including appended check or correction characters. When such a checker provides a negative notification (NACK) to a transmitter, the transmitter may be provided with another opportunity to transmit the non-received or supposed erroneous contents.

Most packet data systems also use Hybrid Automatic Repeat Request (Hybrid ARQ, or "HARQ") as a means to improve transmission efficiency. In Hybrid ARQ, a retransmitted packet is combined with the earlier transmitted packet and then decoded to produce a more reliable estimate of the transmitted packet than with one transmitted packet alone. With hybrid ARQ usage, the operating point (in terms of the carrier to interference ratio [C/I], the modulation and coding scheme etc.) can be chosen more aggressively (than without hybrid ARQ) to permit more retransmissions, while still maintaining a comparable quality of service while simultaneously achieving a higher throughput for the packet data system. However, it is clear that the use of retransmissions requires transmission bandwidth over and above what is required to transmit the packets as determined by the application.

A problem with the existing on-demand allocation method is the high signaling bandwidth needed for conveying information on the allocation to the terminal. The persistent allocation would work reasonably well in the absence of ARQ. However, with ARQ, the need for a retransmission changes with channel conditions and interference levels, and is unpredictable. Thus, the persistent allocation scheme will have to over-allocate resources to account for the additional resources needed for ARQ, or will have to supplement the persistent allocation with an on-demand allocation method. This entails similar problems as to signaling overhead as mentioned earlier.

BRIEF SUMMARY

The technology supplies a semi-persistent resource that a wireless station can use for communication with a base station. The semi-persistent resource is preferably only used by the wireless station for special purposes such as a retransmission of packets for ARQ purposes or transmission of a control signal and can be allocated by the system to other terminals if the special purpose is not required. Since (for example) a retransmission is generally performed in response to a NACK received from a base station, the NACK may itself serve as a token that permits the wireless station to use the semi-persistent allocation. Thus, the technology includes, e.g., a method for resource allocation on a semi-persistent basis and efficient signaling for the usage of such allocation.

One aspect of the technology herein described concerns a method of operating a wireless telecommunications network. The method comprises acts such as: (1) providing a semi-persistent resource for potentially shared use by plural wireless stations on an uplink to a base station; (2) detecting non-receipt or erroneous receipt of a unit of user data from a particular one of the plural wireless stations; (3) providing an indication of the non-receipt or the erroneous receipt to the particular wireless station; and (4) in response to the indication of the non-receipt or the erroneous receipt, the particular wireless station transmitting to the base station using the semi-persistent resource. In one example embodiment and mode, the wireless station (in response to the indication) retransmits at least a portion of the unit of user data to the base station using the semi-persistent resource. In another example embodiment and mode, the wireless station (in response to the indication) transmits a control signal to the base station using the semi-persistent resource.

In accordance with an example mode, the method further comprises the wireless station interpreting the indication of the non-receipt or the erroneous receipt as authorization to use a particular instance of the semi-persistent resource. For example, the particular instance of the semi-persistent resource can be a next-available instance of the semi-persistent resource.

In accordance with an example mode, the method further comprises providing plural persistent resources for transmission to the base station from respective ones of the plural wireless stations. Wireless stations other than the particular wireless station desist or refrain from using the particular instance of the semi-persistent resource In accordance with an example mode, the method further comprises detecting proper receipt of another unit of user data from the particular one of the plural wireless stations but detecting non-receipt or erroneous receipt of a unit of user data from another one of the plural wireless stations, and then the particular wireless station desisting from using another instance of the semi-persistent resource while the another wireless station uses the another instance of the semi-persistent resource for re-transmission.

In accordance with another of its aspects, the technology concerns a wireless telecommunications network comprising plural wireless stations and a base station node. The base station is configured to detect non-receipt or erroneous receipt of a unit of user data from a particular one of the plural wireless stations and to provide an indication of the non-receipt or the erroneous receipt to the particular wireless station. The particular wireless station is configured, upon receipt of the indication of the non-receipt or the erroneous receipt, to transmit to the base station using a semi-persistent resource shared by the plural wireless stations. In one example embodiment and mode, the wireless station (in response to the indication) retransmits at least a portion of the unit of user data to the base station using the semi-persistent resource. In another example embodiment and mode, the wireless station (in response to the indication) transmits a control signal to the base station using the semi-persistent resource.

In an example embodiment, the base station is further configured to allocate the semi-persistent resource for potentially shared use by the plural wireless stations on the uplink to a base station.

In an example embodiment, the wireless station is configured to interpret the indication of the non-receipt or the erroneous receipt as authorization to use a particular instance of the semi-persistent resource. In an example implementation, the particular instance of the semi-persistent resource is a next-available instance of the semi-persistent resource.

In an example embodiment, wireless stations other than the particular wireless station are configured to desist from using the particular instance of the semi-persistent resource.

In accordance with another of its aspects, the technology concerns a node of a wireless telecommunications network comprising a resource allocation manager; a checker; and a deformatter. The resource allocation manager is configured to provide a semi-persistent resource for potentially shared use by plural wireless stations on an uplink to the base station. The checker is configured to detect non-receipt or erroneous receipt of a unit of user data from a particular one of the plural wireless stations and to provide an indication of the non-receipt or the erroneous receipt to the particular wireless station. The deformatter is configured to interpret contents of a subsequent particular instance of the semi-persistent resource. The subsequent particular instance of the semi-persistent resource may, in one example embodiment and mode, be a retransmission of at least a portion of the unit of user data from the particular wireless station. In another example embodiment and mode, the subsequent particular instance of the semi-persistent resource may be transmission of a control signal to the base station node.

In an example embodiment, the resource allocation manager is configured to provide plural persistent resources for transmission to the base station from respective ones of the plural wireless stations.

In an example implementation, the particular instance of the semi-persistent resource is a next-available instance of the semi-persistent resource.

In accordance with another of its aspects, the technology concerns a wireless station for communication over an air interface with a base station. The wireless station comprises a signal handler and a controller. The signal handler is configured to detect a received indication of non-receipt or erroneous receipt of a unit of user data from the wireless station. The controller is configured, upon detection of the indication, to transmit to the base station using a semi-persistent resource shared by the plural wireless stations. In one example embodiment and mode, the wireless station (in response to the indication) retransmits at least a portion of the unit of user data to the base station using the semi-persistent resource. In another example embodiment and mode, the wireless station (in response to the indication) transmits a control signal to the base station using the semi-persistent resource.

In an example embodiment, the controller is configured, upon the detection of the indication, to transmit to the base station using a particular instance of the semi-persistent resource shared by the plural wireless stations. In an example implementation, the particular instance of the semi-persistent resource is a next-available instance of the semi-persistent resource.

In an example embodiment, the controller is further configured to interpret the indication of the non-receipt or the erroneous receipt as authorization to use a particular instance of the semi-persistent resource. In an example implementation, the particular instance of the semi-persistent resource is a next-available instance of the semi-persistent resource.

In an example embodiment, the controller is further configured to interpret an indication of receipt of another particular unit of user data as instruction not to use another particular instance of the semi-persistent resource.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
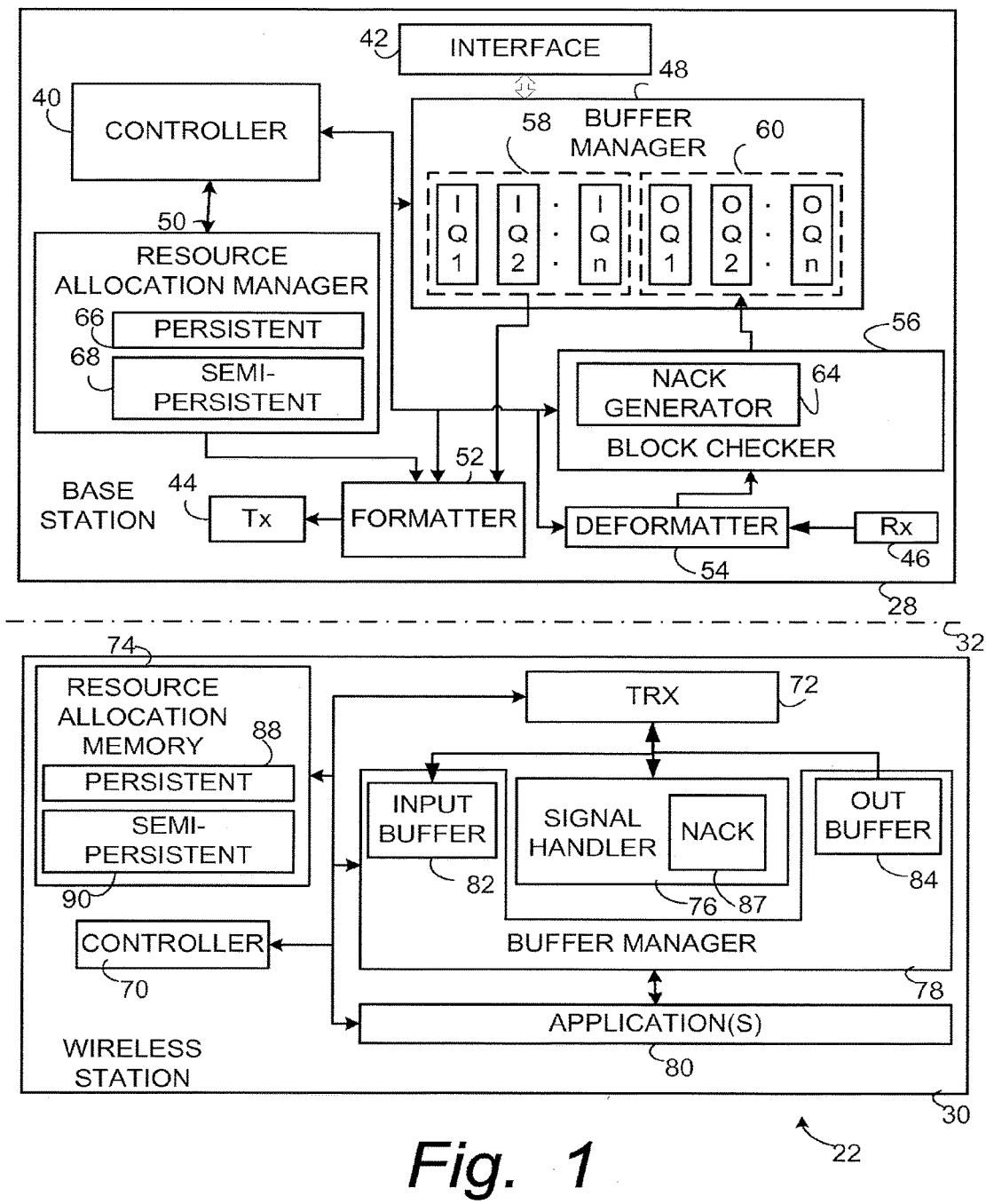
FIG. 1 is a schematic view of portions a radio access network according to an example embodiment.

FIG. 1 illustrates portions of a telecommunications network, and particularly portions of a radio access network 22. The illustrated portions of radio access network 22 include an example radio base station 28 and an example wireless station 30. The radio base station 28 and wireless station 30 engage in radio or wireless communications over a radio or air interface 32. Despite the fact that, for simplification, FIG. 1 shows only one radio base station 28, it will be appreciated that radio access network 22 typically comprises plural radio base stations, and further comprises radio network controller-type nodes for controlling one or more of the radio base stations.

FIG. 1 further shows various example constituent elements of radio base station 28 which are generally pertinent to the technology herein described. Such constituent elements of radio base station 28 include controller 40; an interface 42 (for connection to an unillustrated, superior node such as the aforementioned radio network controller node); transmitter(s) 44 for transmitting on a downlink across air interface 32 to wireless station 30; and, receiver(s) 46 for receiving radio transmissions on an uplink across air interface 32 from wireless station 30. Radio base station 28 further comprises buffer manager 48; resource allocation manager 50; formatter 52; deformatter 54; and block checker 56.

The buffer manager 48 includes logic for directing user data into and out of an appropriate queue or buffer. To this end, buffer manager 48 further comprises a set 58 of output queues IQ1 through IQn, and a set 60 of input queues OQ1 through OIQn.

The output queues IQ1 through IQn of set 58 receive (via interface 42) user data from a superior node of radio access network 22. Each queue IQx (x=1 to n) is associated with a respective connection involving one of the wireless stations served by radio access network 22, and thus stores user data destined for transmission on the downlink across air interface 32 to the respective wireless station. Upon being gated out of a queue IQx of queue set 58, the user data is assembled in a transmission unit by formatter 52. As used herein, a "transmission unit" or "unit of user data" can be any suitable unit, such as a frame, sub-frame, block, sub-block, or packet. Often in the ensuing discussion such a unit is presumed to be a frame, for sake of an example.

How and when the unit constructed by formatter 52 is transmitted on the downlink of a connection on a channel between radio base station 28 and wireless station 30 is determined by resources allocated to the connection by resource allocation manager 50, as described further below. In accordance with the resource allocation, the frame is transmitted on the channel and across air interface 32 by transmitter(s) 44. The transmitter(s) 44 can comprise conventional unillustrated elements, such as a suitable encoder(s), an amplifier(s), and an antenna(e).

The input queues OQ1 through OIQn of set 60 receive user data for differing connections from respective wireless stations. The illustrated wireless station 30 is one such wireless station which may have a connection with radio base station 28. The user data transmitted by and received from a wireless station across air interface 32 is received (e.g., in transmission unit format) at radio base station 28 by receiver(s) 46 and applied in series to deformatter 54 and block checker 56 before being stored in an appropriate one of the input queues OQ1 through OIQn of set 60. The receiver(s) 46 can comprise conventional unillustrated elements, such as an antenna(e), an amplifier(s), and suitable decoder(s). The deformatter 54 serves to reconstruct the signal received by receiver(s) 46 into appropriate transmission units, such as frames. The deformatter 54 understands which frames are received from a certain wireless station, and at what times and over what frequencies, in view of the resource allocation granted by resource allocation manager 50. The frames of user data formed by deformatter 54 are typically comprised of subunits such as blocks or the like, which are applied to block checker 56.

The block checker 56 serves to detect non-receipt or erroneous receipt of a unit of user data from a particular one of the plural wireless stations. To this end, the units of user data as transmitted by the wireless stations typically comprise some identification of the wireless station and/or user data unit sequence number and moreover are often encoded with or have appended thereto certain additional characters such as check characters or error correction characters. Using these identification and check/correction features, in conventional manner the block checker 56 can determine if a unit of user data was lost in transmission across air interface 32, or if a received unit of user data appears to be incorrectly received (e.g., erroneous) in accordance with checking calculations performed by block checker 56 on the received user data unit.

The block checker 56 further comprises NACK generator 64 which serves to generate an indication of the non-receipt or the erroneous receipt (e.g., NACK) of a user data unit. The NACK as generated by NACK generator 64 is sent as a signal transmitted across air interface 32 to the particular wireless station that supposedly transmitted the absent or erroneous user data unit.

Correctly received user data units for a connection are therefore stored under control of buffer manager 48 in an appropriate one of the input queues OQ1 through OIQn of set 60. The user data units are discharged from the input queues OQ1 through OIQn of set 60, either in the same or other units, via interface 42 to a superior node such as the aforementioned radio network controller node.

As mentioned above, one role of resource allocation manager 50 is to determine how resources are to be allocated for a connection between radio base station 28 and wireless station 30. Of particular interest to the present technology are the uplink resources by which a wireless station communicates over air interface 32 to the radio base station 28. Depending on the type of system involved, the resources available for allocation can be of one or more types. For example, in a pure time division multiple access (TDMA) system, differing time units (e.g., differing frames or subframes) can be allocated by resource allocation manager 50 on the uplink for a connection. For an Orthogonal Frequency-Division Multiplexing (OFDM) system, the available resources comprise not only differing time units, but also differing frequencies (orthogonal subcarriers).

In addition to being characterized by attributes such as one or more of time and frequency, the uplink resources supervised and allocated by resource allocation manager 50 can also be characterized to include both persistent resources and semi-persistent resources. The persistent resources are those resources which are periodically and/or predicatably usable (preferably exclusively) by a connection with a wireless station on the uplink, e.g., resources which are assigned exclusively to a connection for initial transmission of user data. A semi-persistent resource, on the other hand, can be shared on the uplink by plural wireless stations and is allocated at any one time to a particular one of the plural wireless stations as may have need (e.g., in view of some operational condition, result, or contingency). For example, the semi-persistent resource can be allocated to permit a connection which experienced a lost or erroneous user data unit to transmit to radio base station 28. Such transmission using the semi-persistent resource can, in one example embodiment and mode, be a retransmission (e.g., a non-initial transmission) of at least a portion of the unit of user data to the base station using the semi-persistent resource. In another example embodiment and mode, the transmission using the semi-persistent resource can be transmission of a control signal to the base station.

To reflect the fact that both persistent resources and semi-persistent resources are provided by resource allocation manager 50, FIG. 1 further illustrates that resource allocation manager 50 comprises both persistent resources manager 66 and semi-persistent resources manager 68.

It should be appreciated that one or more functions of radio base station 28 such as those performed by buffer manager 48, resource allocation manager 50, formatter 52, deformatter 54, and block checker 56 can be performed by one or more controllers or processors (as those terms are expansively employed as explained above), and as such may be differing functional units of a same one or more such controllers or processors. In such case, the controller 40 shown in FIG. 1 can also be a functional unit of one or more such controllers or processors (as those terms are expansively employed as explained above), and serve as supervisory logic for coordinating, sequencing, or supervising the execution of other functionalities of radio base station 28. Alternatively, the functions of the radio base station 28 can be implemented using separate and coordinated controllers or processors (as those terms are expansively employed as explained above).

The example wireless station 30 of FIG. 1 comprises controller 70; transceiver 72; resource allocation memory 74; signal handler 76; buffer manager 78; and one or more executable applications 80. The transceiver 72 combines both transmitter(s) and receiver(s) for communicating over air interface 32 with radio base stations such as radio base station 28. As such, the transceiver 72 comprises appropriate conventional elements such as antennae, amplifiers, encoder (for transmission) and decoder (for reception). User data received over air interface 32 from radio base station 28 is stored under control of buffer manager 78 in input buffer 82 before being applied to a particular application 80 involved in the connection. Conversely, user data such as that generated by the particular application 80 involved in the connection and destined for transmission over air interface 32 to radio base station 28 is stored in output buffer 84 prior to transmission.

Non-user data signals received from or destined to radio base station 28 is processed and/or generated by signal handler 76. One particular signal of interest to the present technology is reception by wireless station 30 of a NACK. As explained previously, the NACK signal can be an indication received from the radio access network of the non-receipt or the erroneous receipt of a user data unit on the uplink from wireless station 30 to radio base station 28. The signal handler 76 includes a NACK-handling functionality, e.g., NACK handler 87.

A connection involving wireless station 30 receives user data from radio base station 28 and sends user data to radio base station 28 over appropriate channel(s) in transmission units, such as frames, for example. As indicated above, the connection is afforded or allocated certain resources (e.g., frames and/or frequencies) for the transmissions, e.g., for both transmissions on the downlink to wireless station 30 and transmissions on the uplink from wireless station 30 to radio base station 28. The identities of the resources allocated to the connection are stored in resource allocation memory 74. Concerning the uplink, the resources allocated include both persistent and semi-persistent resources, as explained previously. To this end resource allocation memory 74 comprises both persistent resource memory 88 and semi-persistent resource memory 90.

It should be appreciated that one or more functions of wireless station 30 such as those performed by buffer manager 78, resource allocation memory 74, and execution of the application(s) 80 can be performed by one or more controllers or processors (as those terms are expansively employed as explained above), and as such may be differing functional units of a same one or more such controllers or processors (as those terms are expansively employed as explained above). In such case, the controller 70 shown in FIG. 1 can also be a functional unit of one or more such controllers or processors, and serve as supervisory logic for coordinating, sequencing, or supervising the execution of other functionalities of wireless station 30. Alternatively, the functions of wireless station 30 can be implemented using separate and coordinated controllers or processors (as those terms are expansively employed as explained above).

Figure 2A:
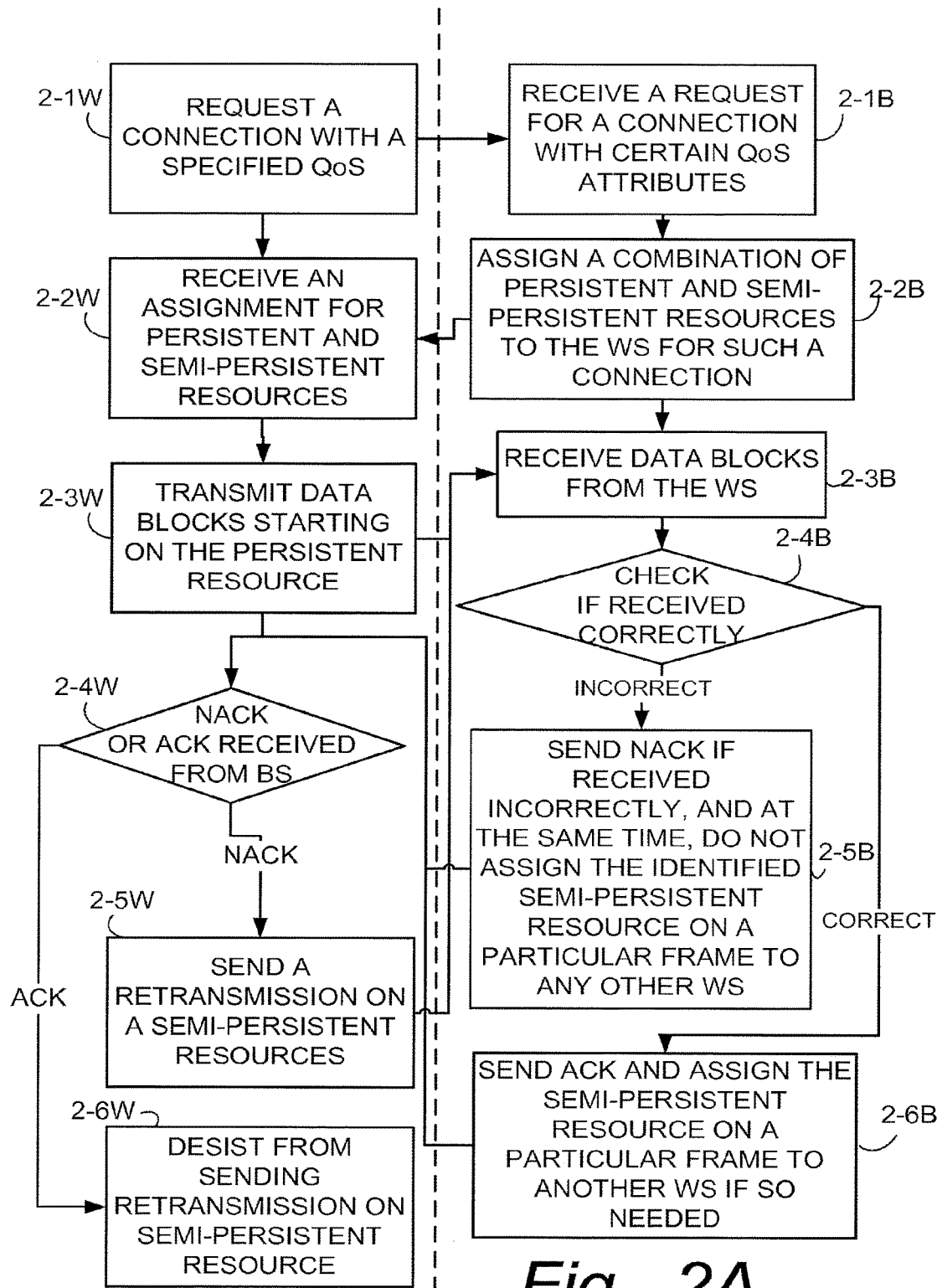
FIG. 2A is a flowchart showing example basic acts performed in conjunction with an example mode of operation of the network of FIG. 1.

A base station operating according to one example embodiment performs basic acts or steps such as those shown in FIG. 2A which are suffixed by the letter "B", while a wireless station ("WS") operating according to the an example embodiment performs basic acts or steps such as those shown in FIG. 2A which are suffixed by the letter "W".

As act 2-1W, the wireless station requests of the radio access network a connection, the connection request specifying certain quality of service attributes for the desired connection. Act 2-1B shows the base station receiving the request of act 2-1W for a connection with the specified certain QoS attributes. Upon receipt of the connection request, as act 2-2B the base station assigns a combination of persistent and semi-persistent resources to the wireless station for such a connection. The resources of the base station are assigned by resource allocation manager 50, and can be characterized in terms of one or more of time and frequency, for example. For example, for a pure time division multiple access (TDMA) system, the resources may be characterized in terms of a time frame or time sub-frame. For an orthogonal frequency multiple access (OFDM) system, the resources may also be further characterized in terms of frequency. Depending on the type of system in which operations occurs, both the persistent and semi-persistent resources may be characterized by one or more of these attributes (time, frequency), or other attributes.

Having received its assignment of both persistent and semi-persistent resources, identities and relevant information (e.g., characteristics) of the persistent and semi-persistent resources are stored in persistent resource memory 88 and semi-persistent resource memory 90. As act 2-3W the wireless station transmits a frame comprising one or more data blocks, starting on the persistent resource. Initially in this regard, act 2-3B reflects the base station receiving a data block from the wireless station. As act 2-4B, the base station checks whether the data block(s) of the frame were received correctly. The block check can be formed by block checker 56 of FIG. 1, for example.

For sake of simplicity, the remainder of the acts of FIG. 2A reflect actions taken or events occurring in conjunction with the handling by the base station of one such data block. If it is determined as act 2-4B that a data block was not received correctly (e.g., one of the data block is considered to be an "error data block"), as act 2-5B the base station sends a NACK message to the wireless station. The NACK message can be generated by NACK generator 64 in an example embodiment. The NACK message explicitly identifies or is otherwise associated with the error data block. At the same time, the base station refrains from assigning the identified semi-persistent resource on a particular frame to any other wireless station. On the other hand, if it is determined as act 2-4B that the data block was received correctly, as act 2-6B the base station can send an ACK message to the wireless station (or at least refrain from sending a NACK message to the wireless station), and therefore is free to assign the semi-persistent resource on a particular frame to another wireless station if so needed.

Act 2-4W of FIG. 2A shows the wireless station receiving either a NACK message (such as that generated by act 2-5B) or an ACK message (such as that generated by act 2-6B), and determining specifically which of the two messages was in fact received by the wireless station. The ACK message or NACK message can be handled by the signal handler 76. If it is determined at act 2-4W that a NACK message was received by the wireless station, the NACK signal is handled by NACK handler 87 and, as act 2-5W, the wireless station sends a retransmission (e.g., of the error data block) on a semi-persistent resource. FIG. 2A further shows that the retransmission of the data block is received (e.g., act 2-3B), checked (e.g., act 2-4B), and further handled by the base station. On the other hand, if it is determined as act 2-4W that an ACK message was received by the wireless station (or that a NACK message was not received), as act 2-6W the wireless station desists from sending retransmission on semi-persistent resource. Accordingly, the wireless station continues with the sending of a further data block.

Considering further the example mode of FIG. 2A, in response to a connection request, either from the terminal (such as that of act 2-1W) or from the network, the system allocates a semi-persistent resource to the terminal for uplink transmissions (see act 2-2B, for example). Information on the quality of service (QoS) or the type of service required can be used by the system in determining the kind of resource to allocate. The resource allocation comprises both a persistent allocation with a certain periodicity, and a non-persistent allocation that is used by the wireless station when required. For example, a voice over Internet Protocol (VoIP) service may generate packets every 20 ms. With a physical layer frame size of 5 ms, only one out of every four frames is nominally needed to transport this service. Thus, the wireless station may be allocated resources on every fourth frame in a persistent fashion. The semi-persistent resources may be allocated in other frames to the wireless station. The wireless station uses these resources mainly for retransmissions, as governed by the ARQ mechanism. The base station sends an ARQ status bit (e.g., act 2-5B or action 2-6B), informing the wireless station whether the transmitted data was received correctly. The base station sends a NACK (act 2-5B) to indicate to the wireless station that the data was not received correctly. The receipt of a NACK signals the wireless station that a retransmission is needed, and this is why it would need to use the semi-persistent resources. Thus, the NACK can itself be used as a permission to the wireless station to use the semi-persistent resource to transmit on the uplink.

Figure 2B:
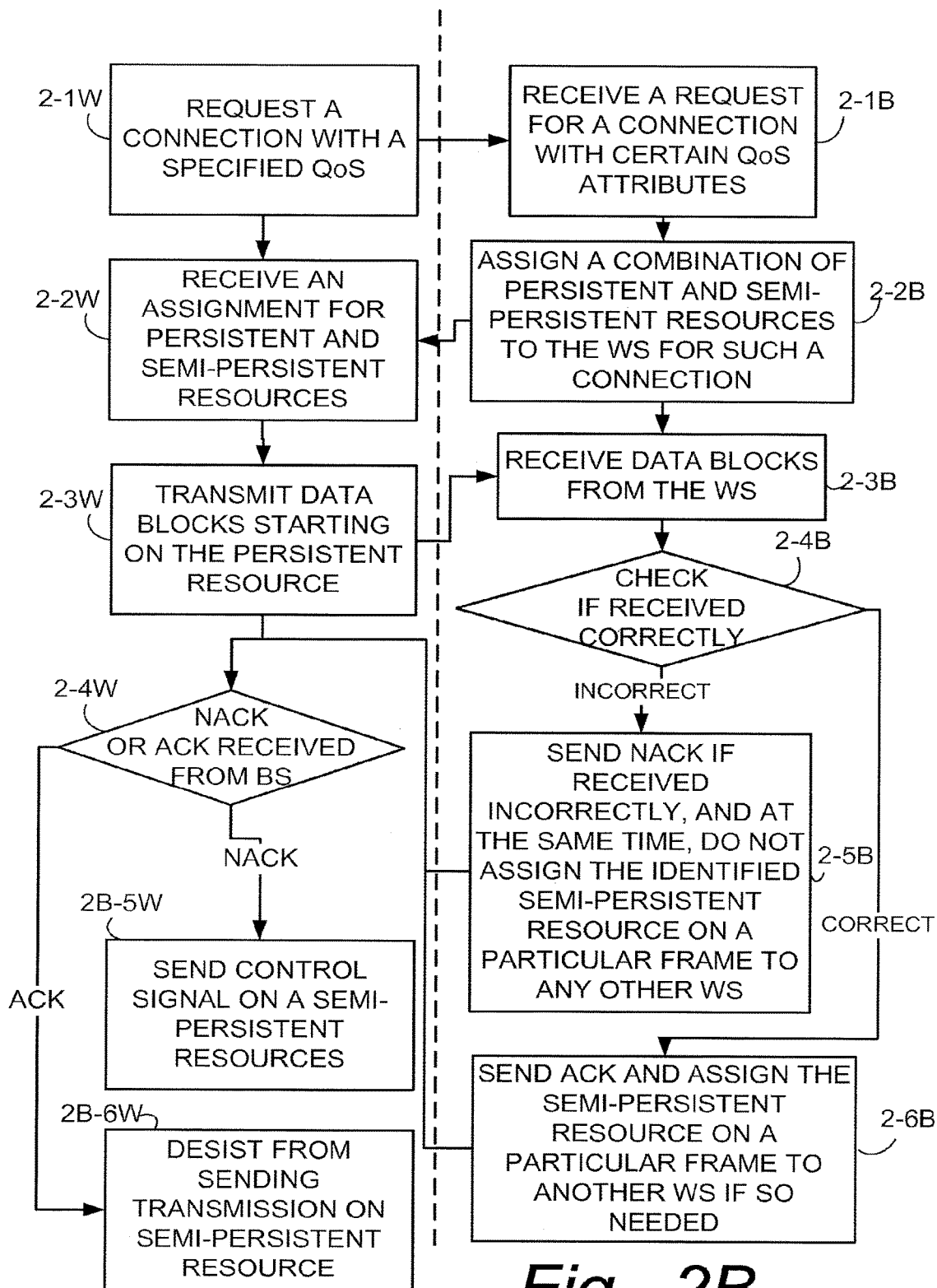
FIG. 2B is a flowchart showing example basic acts performed in conjunction with another example mode of operation of the network of FIG. 1.

FIG. 2A thus illustrates an example embodiment and mode wherein the wireless station (in response to an error indication or the like) retransmits at least a portion of the unit of user data to the base station using the semi-persistent resource. FIG. 2B illustrates example acts or steps involved in another example embodiment and mode wherein the wireless station (in response to the indication) transmits a control signal to the base station using the semi-persistent resource. FIG. 2B is essentially identical to FIG. 2A (as indicated by like-numbered actions), except for act 2B-5W and act 2B-6W.

As act 2B-5W, the wireless station sends a control signal to the base station on a semi-persistent resource. An example of such a control signal that can be sent as act 2B-5B includes a request to the base station for additional bandwidth resources for the transmission involving the wireless station which sends the control signal. On the other hand, if it is determined as act 2-4W that an ACK message was received by the wireless station (or that a NACK message was not received), as act 2B-6W the wireless station desists from sending a control signal or other transmission on semi-persistent resource.

Figure 3:
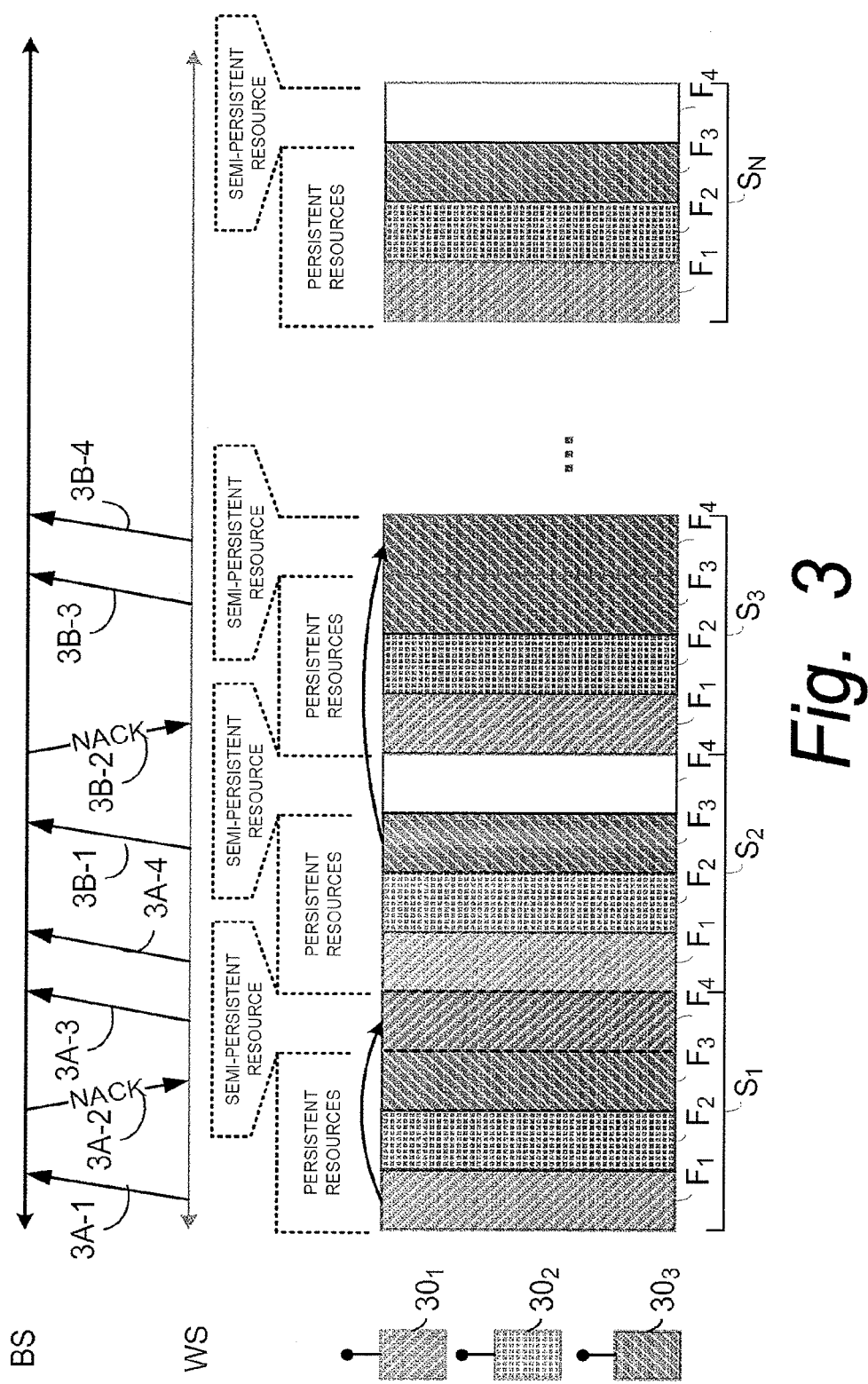
FIG. 3 is a diagrammatic view of a first example access scheme.

FIG. 3 illustrates consecutive events in a simple example time division multiple access scheme in which resources on a single frequency uplink comprise time frames, and particularly shows sets $S_j$ of time frames (where j=1, 2, . . . n), wherein each set $S_j$ comprises four time frames $F_1$-$F_4$. In accordance with an example resource allocation for the scheme of FIG. 3 according to the present technology, frame $F_1$ of each set $S_j$ is allocated as a persistent resource to wireless station $30_1$, while frames $F_2$ and $F_3$ of each set $S_j$ are allocated as persistent resources to wireless stations $30_2$ and $30_3$, respectively. The frames $F_1$-$F_3$ are shaded in correspondence with shading of the wireless stations $30_1$-$30_3$ also illustrated in FIG. 3. As explained below, frame $F_4$ of each set $S_j$ is allocated as a semi-persistent resource to be shared by plural wireless stations, e.g., shared by wireless stations $30_1$, $30_2$, and $30_3$.

In an example scenario depicted by the scheme of FIG. 3, an uplink transmission of user data from wireless station $30_1$ occupying frame $F_1$ of set $S_1$ occurs as shown by arrow 3A-1. Although unillustrated by arrows in FIG. 3, in view of the corresponding shadings it is understood that uplink user data transmissions from wireless stations $30_2$ and $30_3$ occupy respective frames $F_2$ and $F_3$ of set $S_1$.

In the FIG. 3 scenario the transmission of user data from wireless station $30_1$ for frame $F_1$ of set $S_1$ either fails to arrive at the base station or is erroneous. Accordingly, as indicated by arrow 3A-2 of FIG. 3, the base station generates a NACK message which is transmitted to wireless station $30_1$. The NACK message depicted by arrow 3A-2 arrives at wireless station $30_1$ and is processed by wireless station $30_1$ in time for wireless station $30_1$ to consider the NACK as authorization to use the next available occurrence of the semi-persistent resource (e.g., Frame $F_4$ of set $S_1$). It will be understood from the foregoing discussion that the next available occurrence of the semi-persistent resource can be used either for re-transmission of the user data (e.g., of the user data of frame $F_1$ of set $S_1$), or for transmission of a control signal. In the ensuing discussion the particular example embodiment of re-transmission of user data is depicted and described, although the figures also equally well represent the technology of sending a control signal.

Accordingly, as depicted by arrow 3A-3 of FIG. 3, during the semi-persistent resource of frame $F_4$ of set $S_1$ the wireless station $30_1$ re-transmits the user data of frame $F_1$ of set $S_1$ to radio the base station. A next frame of user data is transmitted from wireless station $30_1$ to the base station in frame $F_1$ of set $S_2$, as indicated by arrow 3A-4 of FIG. 3. Although not shown by arrows, further frames of user data from wireless station $30_1$ are transmitted to the base station in corresponding frames $F_1$ of further sets $S_j$, j=3, 4, . . . .

In the particular case shown in FIG. 3, it so happened that the NACK message depicted by arrow 3A-2 arrived at wireless station $30_1$ and is processed by wireless station $30_1$ in time for wireless station $30_1$ to consider the NACK as authorization to use the next available occurrence of the semi-persistent resource (e.g., Frame $F_4$) for, e.g., re-transmission of the user data of frame $F_1$ of set $S_1$. In other systems the NACK may not be generated quite as quickly, in which case the NACK may be received during frame set $S_2$, and in which case the NACK may be considered as authorization for the transmitter $30_1$ to use the next available occurrence of the semi-persistent resource (e.g., Frame $F_4$ of set $S_2$) for re-transmission of the user data of frame $F_1$ of set $S_1$.

Arrow 3B-1 of FIG. 3 is associated with transmission of user data from wireless station $30_3$ to the base station in frame $F_3$ of set $S_2$. The base station either fails to receive or detects an error in the user data transmitted as frame $F_3$ of set $S_2$. Accordingly, as shown by arrow 3B-2, the base station sends a NACK signal concerning the user data transmitted as frame $F_3$ of set $S_2$. The wireless station $30_3$ interprets the NACK signal of arrow 3B-2 as being authorization for the wireless station $30_3$ to use the next available semi-persistent resource for re-sending the user data previously transmitted as frame $F_3$ of set $S_2$. In the scenario shown in FIG. 3, the NACK signal of arrow 3B-2 arrives too late for the wireless station $30_3$ to use frame $F_4$ of set $S_2$ of the semi-persistent resource. From the perspective of the wireless station $30_3$, the next instance of the semi-persistent resource is frame $F_4$ of set $S_3$. Accordingly, and as shown by arrow 3B-4, wireless station $30_3$ waits until frame $F_4$ of set $S_3$ to re-send the user data originally sent as frame $F_3$ of set $S_2$. In the meantime, however, wireless station $30_3$ sends its next frame of user data as frame $F_3$ of set $S_3$ (see arrow 3B-3 of FIG. 3).

The transmission units preferably comprise a sequence number or the like to facilitate, e.g., re-ordering by the base station in the event that transmission units or any subunits thereof are received out-of-order by the base station. Accordingly, considering the events associated with arrows 3B-1 through 3B-4 of FIG. 3 as described above, the base station will be able to provide a proper ordering of the user data even though the user data re-sent as frame $F_4$ of set $S_3$ (and generated to precede in time the content of the user data of earlier-arriving frame $F_3$ of set $S_3$) arrives after the user data of frame $F_3$ of set $S_3$. Functionality such as buffer manager 48 can attend to such re-ordering.

FIG. 3 thus shows the shared nature of the semi-persistent resource (the semi-persistent resource being illustrated as frame $F_4$ in FIG. 3). For example, in frame set $S_1$ the semi-persistent resource (e.g., frame $F_4$ of set $S_1$) was allocated (via the NACK signal of arrow 3A-2), to wireless station $30_1$, but in frame set $S_3$ the semi-persistent resource (e.g., frame $F_4$ of set $S_3$) was allocated (via the NACK signal of arrow 3B-2) to wireless station $30_3$. The wireless stations are arranged (e.g., preconfigured or pre-programmed) not to use the semi-persistent resource unless specifically authorized by a special signal such as the NACK signal, for example.

Figure 4:
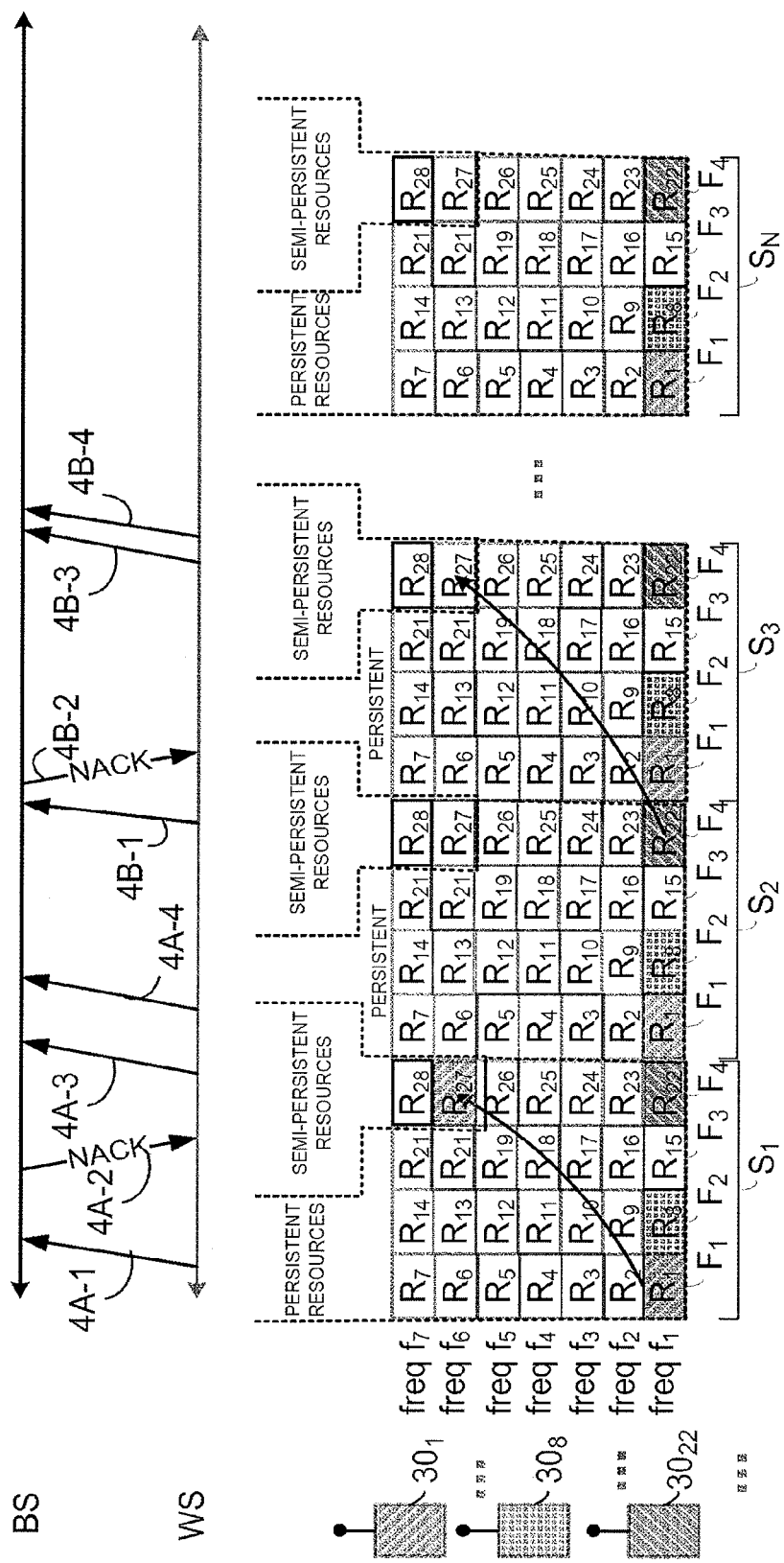
FIG. 4 is a diagrammatic view of a second example access scheme.

FIG. 4 illustrates consecutive events in another transmission scheme, the transmission scheme of FIG. 4 being an orthogonal frequency division multiple access (OFDMA) in which resources are characterized both by time frame and frequency. Frequency division multiplexing (FDM) is a technology that transmits multiple signals simultaneously over a single transmission path. Each signal travels within its own unique frequency range (carrier), which is modulated by the data (text, voice, video, etc.). Orthogonal FDM's (OFDM) spread spectrum technique distributes the data over a large number of carriers that are spaced apart at precise frequencies. This spacing provides the "orthogonality" in this technique which prevents the demodulators from seeing frequencies other than their own. The benefits of OFDM are high spectral efficiency, resiliency to RF interference, and lower multi-path distortion.

In the example scheme of FIG. 4, seven frequencies $f_1$ through $f_7$ are available for allocation on each of four time frames. As in the scheme of FIG. 3, the scheme of FIG. 4 uses sets $S_j$ of time frames (where j=1, 2, . . . n), wherein each set $S_i$ comprises four time frames $F_1$-$F_4$. In accordance with an example resource allocation for the scheme of FIG. 4 according to the present technology, a resource $R_1$ characterized by time frame $F_1$ and frequency $f_1$ is allocated to wireless station $30_1$ of FIG. 4; a resource $R_2$ characterized by time frame $F_1$ and frequency $f_2$ is allocated to unillustrated wireless station $30_2$ of FIG. 4; a resource $R_3$ characterized by time frame $F_1$ and frequency $f_3$ is allocated to unillustrated wireless station $30_3$ of FIG. 4; and so forth. The particular wireless stations which are illustrated in FIG. 4 are the aforementioned wireless station $30_1$, as well as wireless station $30_8$ and wireless station $30_{22}$. Resource $R_8$, characterized by time frame $F_2$ and frequency $f_1$ is allocated to wireless station $30_8$ of FIG. 4; resource $R_{22}$, characterized by time frame $F_4$ and frequency $f_1$ is allocated to wireless station $30_8$ of FIG. 4. The resources $R_8$ and $R_{22}$ are shaded in correspondence with shading of the wireless stations $30_8$ and $30_{22}$ illustrated in FIG. 4. In FIG. 4, resource R27 (characterized by time frame $F_4$ and frequency $f_6$) and resource $R_{28}$, (characterized by time frame $F_4$ and frequency $f_7$) are allocated as (two separate) semi-persistent resources. The remainder of the resources, e.g., resources R1 through R26, is allocated as persistent resources in the scheme shown in FIG. 4. Whereas the persistent resources are dedicated, during at least a significant portion of a connection, to a corresponding wireless station, the semi-persistent resources $R_{27}$ and $R_{28}$ are to be shared by plural wireless stations, e.g., shared by wireless stations $30_1$, $30_8$, and $30_{22}$ as well as any other wireless stations to which the persistent resources are allocated.

In an example scenario depicted by the scheme of FIG. 4, an uplink transmission of user data from wireless station $30_1$ occupying resource $R_1$ of set $S_1$ occurs as shown by arrow 4A-1. Although unillustrated by arrows in FIG. 4, it is understood that uplink user data transmissions from other wireless stations (e.g., wireless stations $30_8$ and $30_{22}$) occupy other resources (e.g., respective resources R8 and R22 for wireless stations $30_8$ and $30_{22}$).

In the FIG. 4 scenario that the transmission of user data from wireless station $30_1$ for resource $R_1$ of set $S_1$ either fails to arrive at the base station or is erroneous. Accordingly, as indicated by arrow 4A-2 of FIG. 4, the base station generates a NACK message which is transmitted to wireless station $30_1$. The NACK message depicted by arrow 4A-2 arrives at wireless station $30_1$ and is processed by wireless station $30_1$ in time for wireless station $30_1$ to consider the NACK as authorization to use the next available occurrence of the semi-persistent resource for re-transmission of the user data of resource $R_1$ of set $S_1$. Accordingly, as depicted by arrow 4A-3 of FIG. 4, during the semi-persistent resource $R_{27}$ of set $S_1$ the wireless station $30_1$ re-transmits the user data of resource $R_1$ of set $S_1$ to radio the base station. A next frame of user data is transmitted from wireless station $30_1$ to the base station in resource $R_1$ of set $S_2$, as indicated by arrow 4A-4 of FIG. 4. Although not shown by arrows, further frames of user data from wireless station $30_1$ are transmitted to the base station using corresponding resources $R_1$ of further sets $S_j$, j=3, 4, . . . .

Arrow 4B-1 of FIG. 4 is associated with transmission of user data from wireless station $30_{22}$ to the base station using resource $R_{22}$ of set $S_2$. The base station either fails to receive or detects an error in the user data transmitted using resource $R_{22}$ of set $S_2$. Accordingly, as shown by arrow 4B-2, the base station sends a NACK signal concerning the user data transmitted using resource $R_{22}$ of set $S_2$. The wireless station $30_{22}$ interprets the NACK signal of arrow 4B-2 as being authorization for the wireless station $30_{22}$ to use the next available semi-persistent resource for re-sending the user data previously transmitted using resource $R_{22}$ of set $S_2$. In the scenario shown in FIG. 4, the NACK signal of arrow 4B-2 arrives too late for the wireless station $30_3$ to use resource $R_{27}$ or resource $R_{28}$ of set $S_2$ of the semi-persistent resource. From the perspective of the wireless station $30_{22}$, the next instance of the semi-persistent resource is resource $R_{27}$ of set $S_3$. Accordingly, and as shown by arrow 4B-4, wireless station $30_{22}$ waits until frame $F_4$ of set $S_3$ to use resource $R_{27}$ of set $S_3$ re-send the user data originally sent using resource $R_{22}$ of set $S_2$. In the meantime, however, wireless station $30_{22}$ sends its next frame of user data using resource $R_{22}$ of set $S_3$ (see arrow 4B-3 of FIG. 4).

Using the re-ordering capability such as that described above, the base station will be able to provide a proper ordering of the user data even though the user data re-sent using resource $R_{27}$ of set $S_3$ (and generated to precede in time the content of the user data of earlier-arriving resource $R_{22}$ of set $S_3$) arrives after the user data of resource $R_{22}$ of set $S_3$.

As explained above, in some embodiments and/or modes of operation, other types of messages can also sent from wireless station 30 using a semi-persistent resource and triggered by some result or contingency. For example, the wireless station 30 may use the semi-persistent resource to send a control message instead of a retransmission.

Advantages of the technology described herein include (for example) lower signaling overhead for resource assignment on the downlink. Other advantages include a potentially lower delay in sending retransmissions in some cases and a reduction in scheduler complexity at the base station. There is also savings on the uplink since the MS does not have to request additional resources.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method in a wireless terminal operating in a wireless telecommunications network, the method comprising:
   receiving an allocation of a semi-persistent resource for potentially shared use by plural wireless stations on an uplink to a base station;
   using a persistent resource for transmitting a unit of user data to the base station;
   receiving from the base station an indication of non-receipt or the erroneous receipt of the unit of user data;
   in response to the indication of the non-receipt or the erroneous receipt, retransmitting the unit of user data to the base station using the semi-persistent resource; and
   wherein a particular instance of the semi-persistent resource used by the wireless terminal is not used by another wireless terminal and the persistent resource is not used by the other wireless terminals.

2. The method of claim 1, further comprising the wireless terminal retransmitting to the base station the unit of user data for which the indication was received by using a particular instance of the semi-persistent resource, and wherein the particular instance of the semi-persistent resource is a next-available instance of the semi-persistent resource.

3. The method of claim 1, further comprising the wireless terminal interpreting the indication of the non-receipt or the erroneous receipt as authorization to use the particular instance of the semi-persistent resource.

4. The method of claim 1, further comprising receiving the allocation of the semi-persistent resource upon connection setup.

* * * * *